US012593129B2

(12) United States Patent
Huang et al.

(10) Patent No.: US 12,593,129 B2
(45) Date of Patent: Mar. 31, 2026

(54) APPARATUS AND METHODS FOR ADJUSTING ZOOM OF A PTZ CAMERA

(71) Applicant: CANON U.S.A., INC., Melville, NY (US)

(72) Inventors: Hung Khei Huang, Irvine, CA (US); Stephanie Ann Suzuki, Irvine, CA (US)

(73) Assignee: CANON U.S.A., INC., Melville, NY (US)

( * ) Notice: Subject to any disclaimer, the term of this patent is extended or adjusted under 35 U.S.C. 154(b) by 62 days.

(21) Appl. No.: 18/807,411

(22) Filed: Aug. 16, 2024

(65) Prior Publication Data

US 2025/0063257 A1     Feb. 20, 2025

Related U.S. Application Data

(60) Provisional application No. 63/563,733, filed on Mar. 11, 2024, provisional application No. 63/520,491, filed on Aug. 18, 2023.

(51) Int. Cl.
| | |
|---|---|
| *H04N 23/69* | (2023.01) |
| *H04N 23/61* | (2023.01) |
| *H04N 23/695* | (2023.01) |

(52) U.S. Cl.
CPC ............. *H04N 23/69* (2023.01); *H04N 23/61* (2023.01); *H04N 23/695* (2023.01)

(58) Field of Classification Search
CPC .... H04N 23/611; H04N 23/61; H04N 23/695; H04N 23/62; H04N 23/69

USPC .................................................... 348/207.99
See application file for complete search history.

(56) References Cited

U.S. PATENT DOCUMENTS

| | | | | |
|---|---|---|---|---|
| 8,284,268 | B2 * | 10/2012 | Imata ...................... | H04N 7/183 |
| | | | | 348/240.99 |
| 9,961,268 | B2 * | 5/2018 | Kimura ................ | H04N 23/695 |
| 10,652,449 | B2 * | 5/2020 | Hattori ..................... | G06T 7/80 |
| 11,076,101 | B2 * | 7/2021 | Kim ........................ | H04N 23/64 |
| 11,100,635 | B2 * | 8/2021 | Wang ..................... | H04N 23/69 |
| 11,678,055 | B2 * | 6/2023 | Kawanago ......... | F16M 11/2014 |
| | | | | 348/208.4 |
| 11,979,663 | B2 * | 5/2024 | Kawanago ............. | G03B 17/00 |
| 12,093,465 | B2 * | 9/2024 | Lu .......................... | G06V 10/82 |
| 12,425,736 | B2 * | 9/2025 | Lee ...................... | H04N 23/631 |

(Continued)

*Primary Examiner* — Pritham D Prabhakher
(74) *Attorney, Agent, or Firm* — Canon U.S.A., Inc., IP Division

(57) ABSTRACT

A control apparatus for determining an amount of zoom to be applied in an image frame is provided and incudes identifying an imaging target in an image being captured by an image capture device, determining, based on a current imaging condition, an amount of zoom applied by the image capture device ensuring the imaging target is substantially centered in an image frame, modifying the determined zoom amount in response to a determination that that the determined zoom amount would cause the image capture device to exceed a directional movement limit, providing a control command to the image capture device that controls the image capture device to obtain an image of the imaging target using one of the determined amount of zoom or the modified zoom amount, and controlling the image capture device to capture an image of the imaging target at the zoom level included in the control command.

19 Claims, 9 Drawing Sheets

(56)        References Cited

U.S. PATENT DOCUMENTS

| | | | |
|---|---|---|---|
| 2009/0102920 A1* | 4/2009 | Yamanaka | G03B 13/00 |
| | | | 348/347 |
| 2013/0230293 A1* | 9/2013 | Boyle | H04N 23/66 |
| | | | 386/224 |
| 2015/0042812 A1* | 2/2015 | Tang | G06V 20/647 |
| | | | 348/157 |
| 2016/0142639 A1 | 5/2016 | Kimura | |
| 2017/0280045 A1* | 9/2017 | Nonaka | H04N 23/695 |
| 2019/0089886 A1* | 3/2019 | Hattori | H04N 23/695 |
| 2022/0239818 A1* | 7/2022 | Kawanago | H04N 23/695 |
| 2023/0082789 A1 | 3/2023 | Lu et al. | |
| 2023/0370720 A1* | 11/2023 | Wang | H04N 23/67 |
| 2024/0073529 A1* | 2/2024 | Lee | H04N 23/631 |

* cited by examiner

Width

1102

Height

1104

1100

1202

1102

1104
$(x_1, y_1)$

Spotlight
height h w

Spotlight Width

APPARATUS AND METHODS FOR ADJUSTING ZOOM OF A PTZ CAMERA

CROSS REFERENCE TO RELATED APPLICATIONS

This application claims priority from U.S. Provisional Patent Application Ser. No. 63/520,491 filed on Aug. 18, 2023 and U.S. Provisional Patent Application Ser. No. 63/563,733 filed on Mar. 11, 2024, the entirety of both applications are incorporated herein by reference.

TECHNICAL FIELD

The present disclosure relates to image processing and, more specifically, to using images captured by an image capture device to adjust the zoom of the image capture device.

DESCRIPTION OF THE RELATED ART

Image capture devices that are controlled to pan, tilt and zoom (PTZ) to capture a desired location are known. In exemplary operation, these PTZ image capture include the capability of moving to pan/tilt to a specified location (x, y) and capture an image frame at the specified location. This movement and subsequent capture PTZ image capture device is configurable using a PTZ camera setting (pan/tilt/zoom). Certain problems exist with current PTZ control operations. More specification, if the PTZ camera has a position whereby the tilt/pan position is near a limit of imposed by the structure of the image capture device, and it is desired to have the PTZ image capture device focus using a zoom command on a desired position close to the border as defined by the limit, the desired position may not be in view due to the mechanical limits of the image capture device. Other issues associated with zoom functionality when applied to particular area in a field of view relate to the amount of zoom. Because the zoom amount, which is configurable, may be fixed, often time the zoom operation performed is insufficient to capture the intended target of an object/person/area to be captured.

SUMMARY

Aspects of the present disclosure are directed to addressing the drawbacks associated with the issues described above. More specifically, the present disclosure provides for automatic adjustments of zoom parameters that are used by the image capture device to ensure that a target capture area is within the image frame even when the position of the image capture device is at its boundary limits based on the motors used to move control the pan and tilt functionality of the image capture device. Furthermore, the present disclosure provides for an adaptable zoom function that controls a zoom amount to be applied by the PTZ image capture device so that target capture area is captured in sufficient detail. This, for example, takes into account a relative distance between the target capture area and the image capture device.

Aspects of the present disclosure include According to the above disclosure, the following methods and control apparatus for determining an amount of zoom to be applied to spotlight a particular region of an image frame can be realized. The processing operations include identifying an imaging target in an image being captured by an image capture device, determining, based on a current imaging condition, an amount of zoom needed to be applied by the image capture device such that the imaging target is substantially centered in an image frame, modifying the determined zoom amount in response to a determination that that the determined zoom amount would cause the image capture device to exceed a directional movement limit, providing a control command to the image capture device that controls the image capture device to obtain an image of the imaging target using one of the determined amount of zoom or the modified zoom amount, and controlling the image capture device to capture an image of the imaging target at the zoom level included in the control command.

Further aspects are reflected in the claims appended herein all of which are directly incorporated into the specification hereof as respective embodiments of the present disclosure.

Features, and advantages of the present disclosure will become apparent based upon the following detailed description of exemplary embodiments, when taken in conjunction with the appended drawings, and provided claims.

Figure 1:
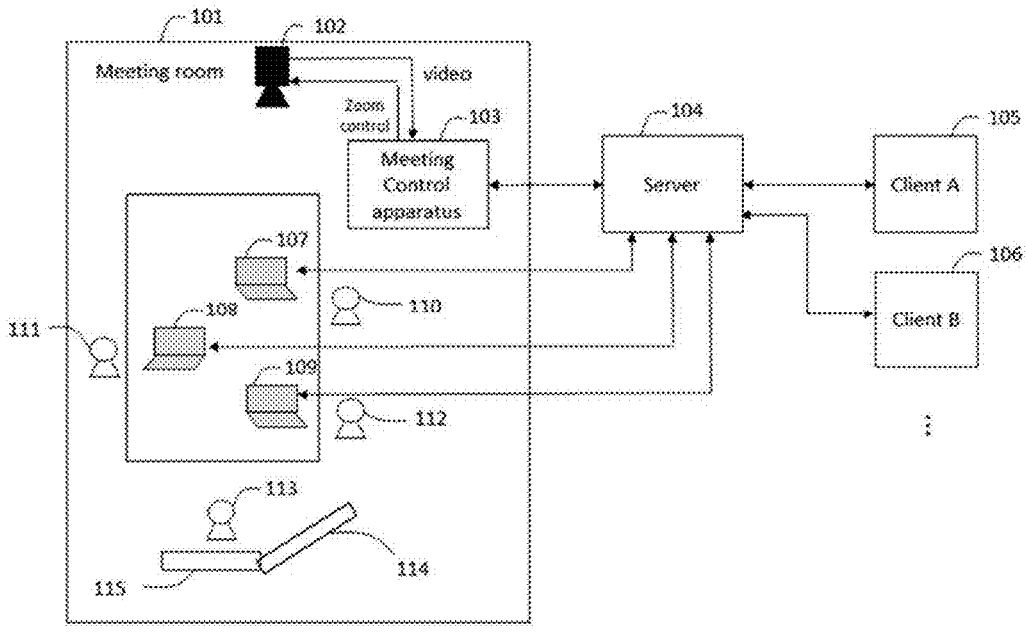
FIG. 1 is a block diagram of illustrating a system architecture of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Exemplary embodiments of the present disclosure will be described in detail below with reference to the accompanying drawings. The following exemplary embodiments are merely examples for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

According to the present disclosure, an apparatus and method for controlling the position of an image capture device that includes PTZ functionality is described. More specifically, the control of the image capture device is provided during an online meeting between users at a first location (e.g. in-person location) and at least one other user a second location remotely located the first location. This, for example, represents a hybrid meeting environment. Once the image capture device (e.g. camera or PTZ camera) is caused to move (e.g. pan/tilt) to the location (i.e., the specified location (x, y) is the new center of the frame), the image will zoom to the specified location. In operation, a requested zoom amount to be applied by the image capture device is fixed but is also configurable depending on the image capture conditions. This zoom amount is then adaptively updated based on image capture conditions as discussed hereinbelow. A still image is then captured and saved. The purpose of this feature is to provide a close up view of an object to remote clients so they can view the subject being captured in greater details. This fosters collaboration between one or more users in a location where the image capturing is being performed and the one or more users remotely located therefrom and viewing the captured images on a display screen of a computing device (e.g. laptop, tablet, smartphone or the like).

FIG. 1 illustrates a system architecture according to an exemplary embodiment. The system includes an image capture apparatus 102, a meeting control apparatus 103, a server 104, a client computer A 105, a client computer B 106 and communication apparatuses 107-109. The communication apparatuses 107-109 can be a laptop computer, a tablet computer, a smartphone or other type of computing devices and are operated by respective attendees 110-112.

As illustrated in FIG. 1, the client computer A 105 and the client computer B 106 connect to an online meeting held in the meeting room 101 via communication network such as the internet or other local or wide area network. In the present embodiment, the image capture apparatus 102, the meeting control apparatus 103, the communication apparatuses 107-109, the attendees 110-112, a presenter 113 and writing surfaces (e.g. whiteboards) 114-115 are present in the meeting room 101 where an online meeting will be originated and which will includes users of client computer A 105 and client computer B 106. This is but one exemplary type of meeting situation and should not be seen as limiting. In another exemplary embodiment, for example, the functionality provided by the meeting control apparatus 103 as described below can be located in the cloud.

The meeting control apparatus 103 includes all the local modules required to facilitate an online meeting between users in the meeting room 101 and remote users. The modules include, but are not limited to, a gesture recognition module, image capturing apparatus control module (pan/tilt/zoom), and meeting state management module. The server 104 manages meeting resources, and communication/synchronization between clients and modules included in the meeting control apparatus 103.

The image capture apparatus 102 captures video in the meeting room 101 while a meeting is in progress. The image capture apparatus 102 captures gestures by the attendees 110-112 and the presenter 113. The captured video is transmitted to the meeting control apparatus 103. As described above, the meeting control apparatus 103 can recognize user's gesture included in the video, and execute the process corresponding to the gesture. The details will be described below.

Once the online meeting is started by a user present in the meeting 101, the client computer A 105 and the client computer B 106 can be provided a link which enables those devices to access the meeting which has begin and display the video captured by the image capture apparatus 102 within a user interface on their respective devices 105/106 so that remote attendees can view what is going on in the meeting room 101. The image capture apparatus 102 is positioned to capture a single, wide view of the meeting room 101 such that all participants and any writing surface present in the meeting room can be captured and provided to the remote participants. This, for example, includes, anything that may be written on the white boards 114-115. The communication apparatuses 107-109 can display the same video so that attendees 110-112 are able to view what the remote attendees are viewing. Additional operations performed by the meeting control apparatus 103 in combination with the image capture apparatus 102 which further improve the view that remote participants are provided will be discussed hereinbelow.

Figure 2:
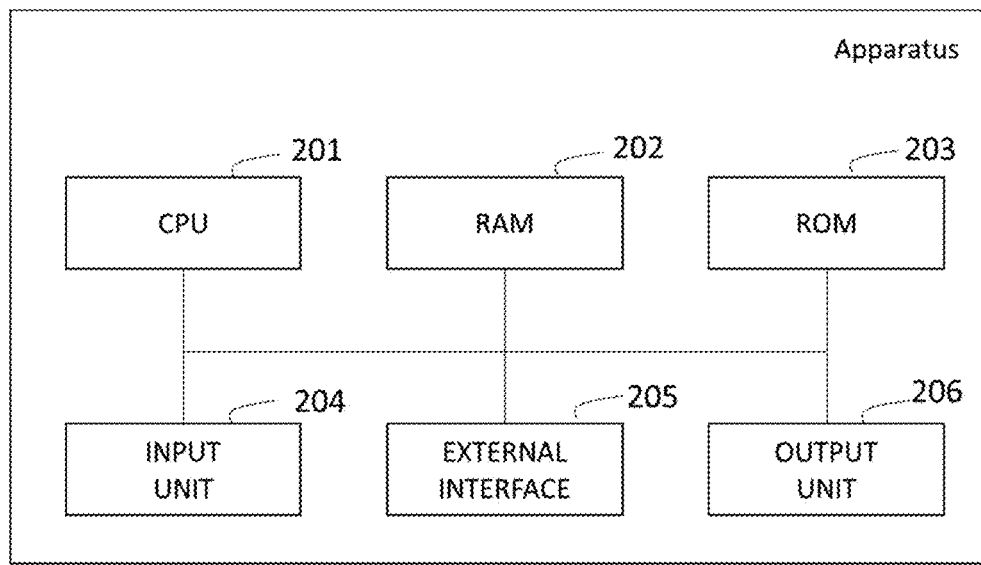
FIG. 2 detailing the hardware components of an apparatus that executes the algorithm according to the present disclosure.

FIG. 2 illustrates a hardware architecture according to an exemplary embodiment that represents the hardware architecture of the image capture apparatus 102, the meeting control apparatus 103, the server 104 and the communication apparatuses 107-109. The hardware architecture includes a CPU 201, a RAM 202, a ROM 203, an input unit 204, an external interface 205, and an output unit 206. For description purposes, the meeting control apparatus 103 will be referred to/used to describe the various components illustrated in FIG. 2.

The CPU 201 controls the meeting control apparatus 103 via a computer program (one or more series of stored instructions executable by the CPU 201) and data stored in the RAM 202 or ROM 203. The meeting control apparatus 103 can include one or more dedicated hardware or a graphics processing unit (GPU), which is different from the CPU 201, and the GPU or the dedicated hardware can perform a part of the processes by the CPU 201. As an example of the dedicated hardware, there are an application specific integrated circuit (ASIC), a field-programmable gate array (FPGA), and a digital signal processor (DSP), and the like.

The RAM 202 temporarily stores the computer program or data read from the ROM 203, data supplied external from the meeting control apparatus 103 via the external interface 205, and the like. The ROM 203 stores the computer program and data that do not need to be modified and that can control the basic operation of the meeting control apparatus 103.

The input unit 204 is composed of, for example, a joystick, a jog dial, a touch panel, a keyboard, a mouse, or the like, receives a user operation, and inputs various instructions to the CPU 201. The external interface 205 communicates with external device such as PC, smartphone, camera and the like. The communication with the external devices can be performed via a wired interface such as a local area network (LAN) cable, a serial digital interface (SDI) cable or can performed wirelessly via a wireless interface such as Wi-Fi®, etc., The output unit 206 is composed of, for example, a display unit and a sound output unit such as a speaker, and displays a graphical user interface (GUI) and outputs a guiding sound so that the user can operate the meeting control apparatus 103 as needed.

In exemplary operation, the online meeting initiated by the meeting control apparatus 103 and facilitated by server 104 advantageously enables remote participants to view the specific goings on of in the meeting room. This includes, for example, viewing images of the in-room participants and any writing they perform on the writing surfaces or anything displayed on a display surface such as a table thereby enabling effective communication in a hybrid work environment. Of particular relevance to the present disclosure is triggering an operation that allows a user in the room to select or otherwise identify an image capture target and, based on that selection/identification, then determine the optimal zoom level to be applied to ensure that the image capture target is viewable in sufficient detail and also considers the maximum pan/tilt position of the image capture device.

In exemplary embodiments, the one or more predetermined processing operations are responsive to user behavior and/or movement that is captured by the image capture apparatus 102 and processed by one or more of the control modules executing on the meeting control apparatus 103 includes and serve as the triggering operation. In other embodiments, the triggering operation results from a user interacting with one or more input devices such as a mouse or a touch screen to physical select, within an image that is currently being captured by the image device and which is concurrently being displayed on a display screen. For example, a tablet computing device that displays a real-time image being captured by the image capture device and the triggering operation includes a user selecting, within that image an area on which further processing is performed. In any of these embodiments, the processing operation corresponding to the triggering operation is a "Spotlight" operation. The "Spotlight" operation refers to capturing an image by the PTZ image capture device of a location where either the user places their hand or the area selected on the display device. In a case where the user behavior is used to trigger the "Spotlight" operation, the user behavior is a gesture where a user opens and closes their fingers with the palm of the user's hand facing the image capture apparatus 102. In a case where the interaction with the image being displayed on the display device is the trigger, the interaction is selection within that image via touch screen and/or mouse that causes a bounding box to be drawn and superimposed over the image being displayed in the display device. As used herein, the display device may be embodied in tablet computer, smartphone and/or laptop computer. These are merely exemplary and any computing device that includes or is coupled to a display and which can receive input from a user may be used.

The "spotlight" operation results in identifying the target image capture area so that the in-person participants can share the desired information with all remote participants. To achieve this, the live capture function of the PTZ image capture device is paused such that the field of view of the PTZ image capture device is changed in order to perform a zoom operation and capture a high-resolution still image of the target within the identified target image capture area. More specifically, the image data corresponding to the "Spotlight" is extracted from the captured video data by the meeting control apparatus 103. The meeting control apparatus 103 then communicates with the server 104 via communication network to transmit the image data to the client computers A105 and B106. Each of the client computers A105 and B106 display the image data concurrently with at least a wide angle view, which was captured by the image capture apparatus 102, of the room where the "Spotlight" occurred.

The present disclosure provides an algorithm for determining and computing the proper zoom level based on the particular position of the target to be capture. Once the zoom amount is correctly determined, the control apparatus sends a control command including the computed zoom amount to the image capture device 102 along with pan and tilt information that will control the PTZ image capture device to both pan and tilt such that the imaging target is substantially in a center position with the image frame to be captured and the zoom amount controls the zoom function to obtain a closer view of the imaging target. In order to achieve this such that an optimal image capture is performed and subsequently displayed to the remote participants, the present algorithm advantageously identifies position of the PTZ imaging device and a relative distance of the imaging target from the image capture device 102. The algorithms that follow are performed by CPU 201 of the meeting control apparatus 103 executing a program stored in RAM 202 or ROM 203 of the meeting control apparatus 103. The process enables the optimal zoom be applied based on both the position of the image capture device in an X and Y direction as well as based on a distance between imaging target and the image capture device.

In operation, the PTZ image capture device is operating in a first live capture mode whereby the meeting control apparatus 103 is causing image capture device 102 be have a first zoom amount that enables capture of video data within a first field of view. In one embodiment, the first zoom amount is a zoom amount that enables capture of a wide angle view of substantially all of the users in person in the meeting room. This first live capture mode provides live video data to all remote participants as discussed above. When a respective one of the users in the meeting performs a triggering operation as defined above, the image capture device is controlled to transition from the first live capture mode to a second still image capture mode whereby the image capture apparatus is controlled to pan and tilt such that the imaging target is substantially center of an image frame to be captured and zoom according to an adaptively determined zoom amount room desire to enlarge the imaging target and capture a still image of the imaging target. This captured image in the second mode is stored in memory and the control apparatus causes the stored captured image of the imaging target to be communicated, via a network, to the one or more remote participants. After the image has been captured, the meeting control apparatus causes the image capture device 102 to return back to the first mode of operation and capture the previously set field of view as live capture video which is also, provided to one or more remote participants.

Accordingly, the algorithm makes a first determination that determines both the position of the imaging target relative to the pan and tilt limits of the image capture device and a second determination that determines the distance of the imaging target in order to calculate the zoom amount information that is used. These determinations are made by the control apparatus based on the type of triggering action that is performed. They may occur simultaneously or in any sequence.

Figure 3:
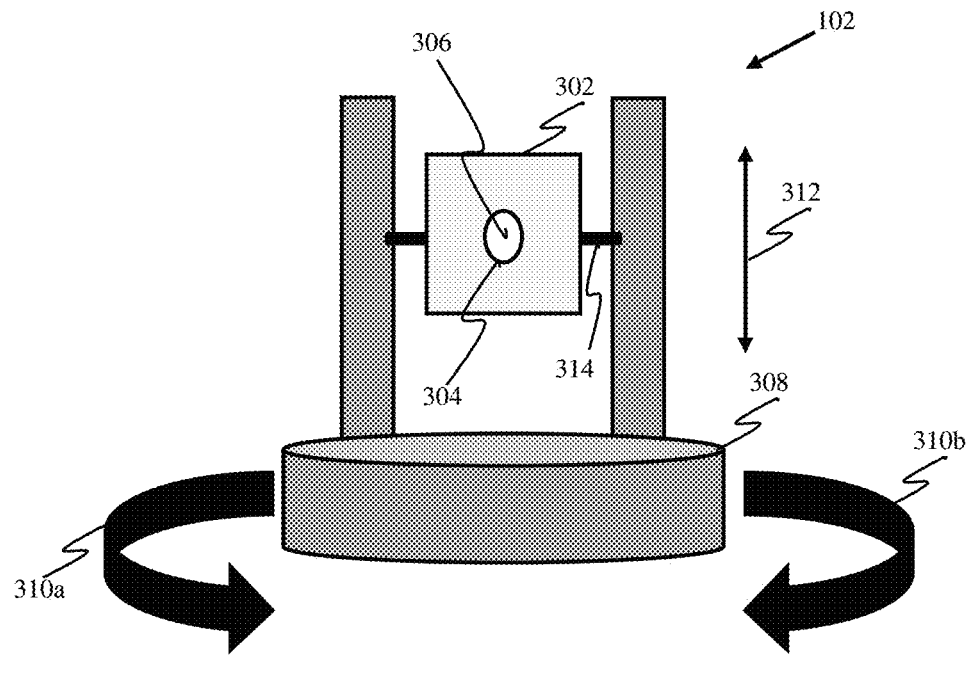
FIG. 3 illustrates an image capture device used in accordance with the present disclosure.

An exemplary manner for computing the first determination is provided. FIG. 3 illustrates an exemplary PTZ image capture device 102 (in FIG. 1). As shown in FIG. 3, a body 302 of the PTZ image capture device 102 includes at least one lens 304 that is used to capture light and perform both live video image capture and still image capture. As shown herein, the lens 302 of the image capture device 102 is positioned at an origin 306 of an X-Y coordinate system The image capture device 102 includes one or more control motors (not shown) that control movement of a support structure 308 to rotate and can pan in a direction illustrated by the curved arrows 310a and 310b and can cause the body 302 to move in an positive and negative X-direction until a positive and negative pan limit is reached as illustrated by the arrow labeled 312. Additionally, the body 302 of the image capture device 102 that includes the lens can tilt about an axis 314 as shown herein in the positive and negative Y direction illustrated by the arrow 312 in FIG. 3 until a positive and negative tilt limit is reached. The respective pan and tilt limits are a function of the control motors of the image capture device and the actual limit need not be specified, rather, the existence of a positive and negative pan and tilt limits are the relevant aspect described herein and are used in making the first determination.

Figure 4:
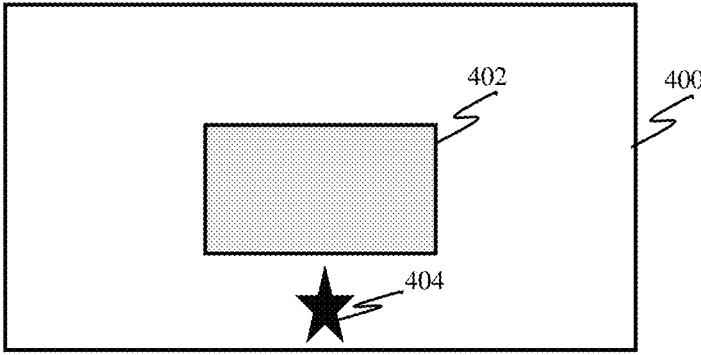
FIG. 4 illustrates an image capture region being captured by the image capture device according to the present disclosure.

Once the camera is controlled by the processing algorithm which signals the control motors to pan/tilt to the location (i.e., the specified location (x, y) is the new center of the frame), a zoom control command will be generated and provided to the image capture device 102 that causes a zoom to be performed to modify a region of a frame to be captured to be the the specified location. A still image is then captured and saved in a memory. The purpose of this feature is to provide a close up view of an object to remote clients so they can view it in greater details. In case where a zoom amount is fixed, is if the camera initial position has a tilt/pan near the limit of the camera, the camera will not be able to place the specified location (x, y) at the center of the new frame (the specified location may be near the border of the new frame after pan/tilt). In this case when zoom is applied, the target object may not be in view in the still image captured. Performing the first determination herein corrects this by ensuring that the imaging target always remains in view without regard to the specific initial position of the camera. The problem is illustrated in FIG. 4 which illustrates an image capture region 400 that is capturable after the image capture device 102 is control to pan/tilt to a desired location and when a predetermined zoom amount applied to a particular zoom region 402 results in the target object 404 (e.g. imaging target) being outside of the zoom region 402 in the image frame captured according to a static zoom level. The zoom control processing performed according to the present disclosure is improved by adaptively determining a zoom amount to be applied at a given time such that the applied zoom amount ensures that zoom region 402 will include the target object 404.

Figure 5A:
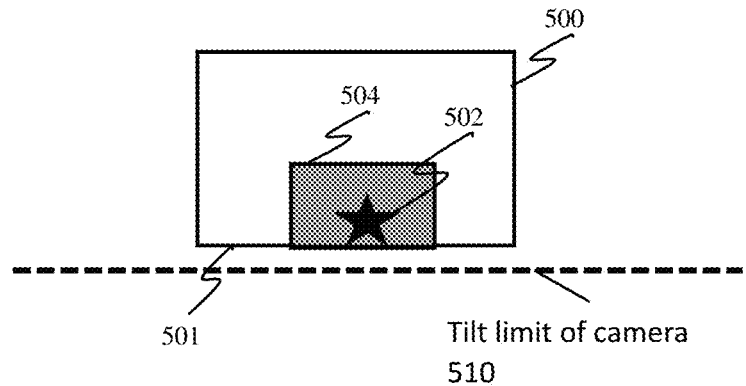
FIGS. 5A-5C illustrate image capture regions being captured by the image capture device according to the present disclosure.
Figure 5B:
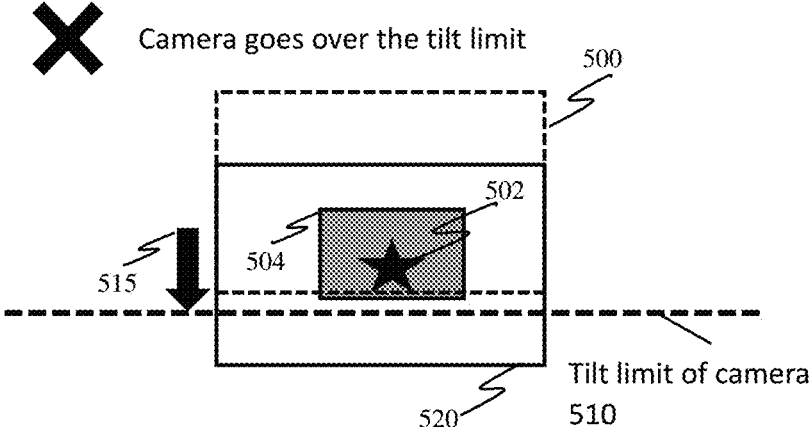
Figure 5C:
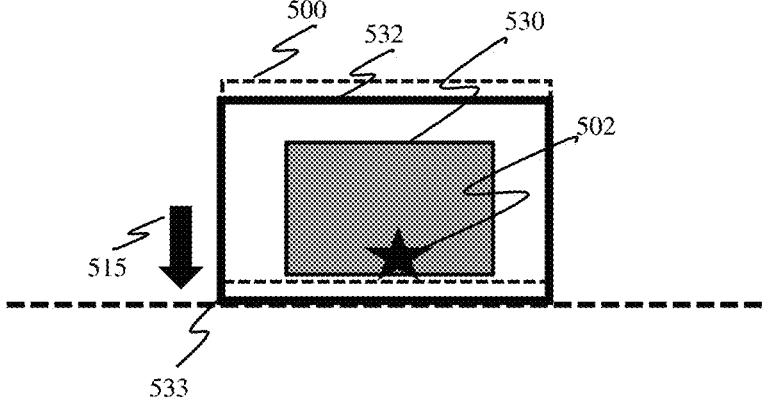

An illustration of how the algorithm that performs the first determination is illustrated in FIGS. 5A-5C. FIG. 5A illustrates a current image capture area 500 being captured during the first live view mode and further illustrates a negative tilt limit plane 510 of the image capture device 102 in FIG. 1. As shown herein, the imaging target 502 is close to a bottom 501 of the image frame being captured and proximate to the negative tilt limit 510. Further shown in FIG. 5A is a target zoom region 504 that would be used and which surrounds the imaging target.

However, as shown in FIG. 5B, the initial image frame 500 from FIG. 5A is now illustrated as a dotted line and the solid line 520 indicates the ideal image frame corresponding to an ideal position where the camera should be controlled to move in a direction corresponding to arrow 515 to perform image capture in order to achieve the target zoom 504 such that the target object 502 is zoomed in upon. But, in view of the negative tilt limit 510, the camera 102 is unable to tilt far enough in direction 515 to capture to imaging target at the target zoom. Thus, the result of the first determination calculates an adjusted a target zoom area based on the tilt limit and controls the image capture device to be able to approach the desired position that would capture the image frame represented by the solid line in FIG. 5B without exceeding the negative tilt limit. In so doing the target zoom area is adjusted to ensure that the imaging target 502 is within the still image to be capture when in the second still image capture mode. This is illustrated in FIG. 5C. As a result, the camera 102 is controlled to move as close as possible to the imaging target 502 and the zoom amount is adjusted to generate an adjusted zoom region 530 cover the original selected area occupied by target object 502. As shown in FIG. 5C, the camera 102 is controlled to move in the direction of arrow 515 such that bottom boundary 533 of a desired image capture region 532 approaches (or reaches) the negative tilt limit 510. This region 532 is shown overlaid with the original image capture area 500 shown in dotted line.

Figure 6:
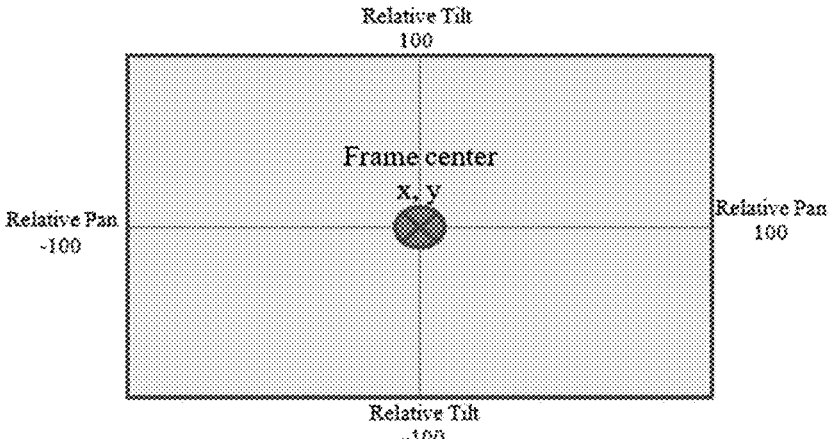
FIG. 6 illustrates an image capture region being captured by the image capture device according to the present disclosure.

The algorithm for performing this determination will now be described. Execution of this algorithm adjusts the zoom amount based on the final location after the image capture device 102 is controlled to one of, or both, pan and tilt whereby the control of the pan and tilt and zoom of the image capture device 102 is based on a location in the current frame. FIG. 6 illustrates an exemplary image frame 600 being captured by the image capture device 102. Image frame 600 includes a frame center where the x and y values are zero and also illustrates positive relative tilt value and negative relative tilt value along with the negative relative pan value and positive relative pan values. The values illustrated in FIG. 6 show exemplary pan and tilt limits available to the image capture device 102. As shown herein a relative zoom value where the frame center is shown in FIG. 6 indicates that there is no zoom whereby a center position of the zoom region is a center point of the image frame 600. Further, because FIG. 6 illustrates the center as shown herein, it is understood that the relative tilt and pan values are zero as well indicating the focus region of the image capture device is substantially a center of the image frame 600. The zoom adjust algorithm according to the present disclosure will be described with respect to the algorithm in FIGS. 7A and 7B along with the exemplary image frames in FIGS. 8 and 9.

Figure 7A:
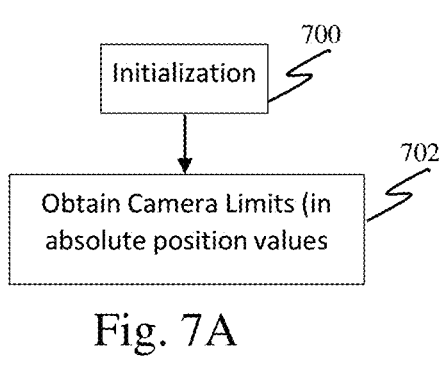
FIGS. 7A & 7B are flow diagrams illustrating the processing algorithm performed according to the present disclosure.
Figure 7B:
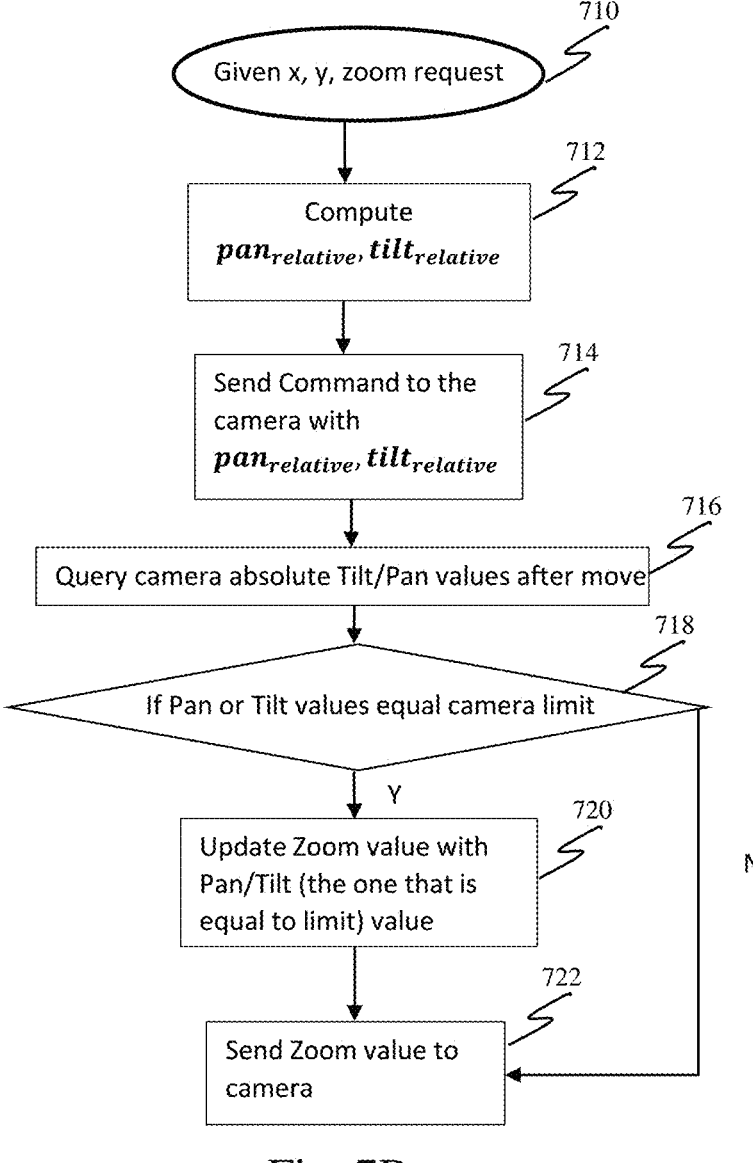

FIG. 7A illustrates an initialization process performed by the meeting room control apparatus 103 in FIG. 1. In step 700, initialization occurs and in 702, information characterizing maximum directional movement is obtained from the image capture device 102. In certain embodiments the maximum direction movement include Maximum absolute tilt ($Tilt_{max}$), Minimum absolute tilt ($Tilt_{min}$), Maximum absolute pan ($Pan_{max}$, and Minimum absolute pan ($Pan_{min}$). These values correspond to those illustrated in FIG. 6.

In exemplary operation, user's selectively perform a spotlight operation whereby a target object to be captured is identified resulting in the image capture device 102 being controlled to zoom in on and capture a zoomed-in image of the target object. In so doing, a trigger action is performed by a user which triggers the processing for determining an adapted zoom level that is communicated to the image capture device 102. In one embodiment, the trigger action includes a user present in the meeting room 101 and currently in the field of view of the image capture device 102 making a predetermined gesture that is selectively captured and processed by a gesture recognition module executing on the meeting control apparatus 103. The gesture recognition module is a set of computer executable instructions that identifies a particular part of (or a set of parts in a case where the gesture is a pose) the human body and determines that the identified part is positioned or otherwise arranged in a predetermined form indicating that the trigger action has been performed. In another embodiment, the trigger action may be selection of a particular region in an image frame that is currently being captured by the image capture device 102 and which is being displayed by the meeting control apparatus 103 either on a display directly connected thereto or via a display of a computer device connected to the meeting control apparatus 103. The region selection may be performed using an input device such as a mouse or via input received at a touch screen.

As such, in step 710 a trigger action is performed and detected such that a new $x_1$, $y_1$ location in the image frame is requested to tilt, pan, zoom into. In step 712, the relative tilt, pan values from current center x, y to new location (center) $x_1$, $y_1$ are computed in as follows. The relative pan value is computed using Equation (1) and the relative tilt value is computer using Equation (2).

$$\text{pan}_{relative} = \frac{\tan^{-1}\left(\tan\left(\frac{fl*\pi}{180}\right)*\left(\frac{\left(x_1^{-f_w/2}\right)}{f_w/2}\right)\right)*100}{\left(\frac{fl*\pi}{180}\right)} \tag{1}$$

$$\text{tilt}_{relative} = \frac{\tan^{-1}\left(\tan\left(\frac{fl*\pi}{180}\right)*\left(\frac{\left(y_1^{-f_h/2}\right)}{f_h/2}\right)\right)*(-100)}{\left(\frac{fl*\pi}{180}\right)} \tag{2}$$

where:
   $f_h$—frame height
   $f_w$—frame width
   $f_f$—camera current focal length The values output by the computations in step 712 are communicated as a relative movement command with values corresponding to pan$_{relative}$ and tilt$_{relative}$ to the image capture device 102 to the camera. In step 714, a query is sent to the camera to obtain current absolute pan (Pan$_{abs}$) and absolute tilt (Tilt$_{abs}$). In step 716, a determination is made whether the relative pan and tilt values cause the camera to move and exceed any of its absolute pan and/or absolute tilt values which will then be used to selectively modify the zoom amount, in step 720, to be applied to ensure that the zoom will still be able to capture the target object. The processing steps performed in steps 718 and 720 will now be described.

If the absolute pan value (Pan$_{abs}$) equals the left pan limit (Pan$_{min}$, whereby Pan$_{abs}$=Pan$_{min}$, this indicates that the relative move command issued in 714 causes camera to reach the left pan limit. In response thereto, step 720 issues a reduce zoom request calculated in accordance with Equation (3)

$$\text{Zoom}_{updated} = \max(\text{Zoom}_{request}, -\text{Pan}_{relative}) \tag{3}$$

This advantageously allows for, when camera pan limit is reached, relative move requests closer to original center can accommodate more zoom without falling out of the zoomed frame. If the relative move requested is large such that the target is near the border of the frame, the updated zoom amount needs to be less that the predetermined zoom amount so that the target is not cut out of the zoomed frame.

In Equation (3), "Zoom request" is the requested zoom amount to obtain the imaging target and it may include a preconfigured zoom amount and "Pan relative" represents instruction values sent for controlling the camera movement amount obtained by above equation (1). For example, Zoom$_{request}$ is a value where 100 indicates no zoom (keep current value), 10 indicates zoom to 10% area of current frame, etc. Pan$_{relative}$ is a value ranging from −100 to 100, where 0 indicates no pan. The +/−sign indicates pan left/right. So in this case if the result of the pan reaches the limit (border) we will reduce the zoom using Pan$_{relative}$ if its value is higher than the value of Zoom$_{request}$. This will result in less zoom (a pan request that will move the camera closer to the border will result in the reduction of zoom (zoom closer to 100) if the result of the pan hits the maximum/minimum pan.

Figure 8:
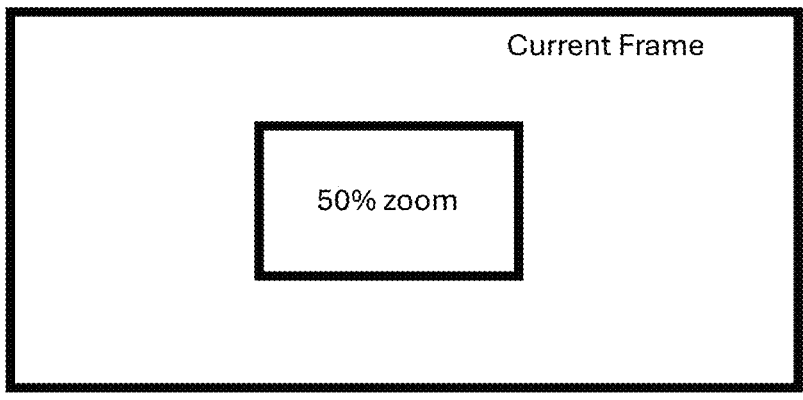
FIG. 8 illustrates an image capture region being captured by the image capture device according to the present disclosure.

The Pan/Tilt/Zoom move values are all relative to the current location. A request of Pan=0, Tilt=0,Zoom=100 means the camera will remain in current setting without any change. A Pan=100 makes the camera to pan all the way to the right edge of current frame (the right edge will become the new x center of new frame). A Tilt=100 makes the camera to tilt all the way to the bottom edge of current frame (the bottom edge will become the new y center of new frame). A value of 50 will move the half point between the current center and the edge. As for Zoom, a Zoom=50 will zoom the camera so that in the zoomed frame will contain 50% of current frame view (keeping current center). This is illustrated in FIG. 8.

The result of the updated zoom causes the center of the resulting frame not be the edge of the original frame. The resulting center point will be automatically modified to be the resulting field of view of the camera can after reaching the pan (or tilt) limit. According to this algorithm once the limit is reached, the zoom amount is corrected by using the value of Pan/Tilt as zoom, since the higher the value of Pan/Tilt as the updated or corrected amount so the target will be viewable in the resulting frame. Thereafter, in step 722, the resulting value of Zoom$_{updated}$ is sent as a command to the image capture device to control the camera to move and pan and zoom and capture a still image of the zoomed in region having the target object. In certain embodiments, a live-view (video) image may also be captured using the Zoom$_{updated}$ value depending on a type of image capture mode that is set.

The above processing and determination described above regarding if the absolute pan value reaches the minimum pan value (Pan$_{abs}$=Pan$_{min}$), is also performed to determine whether the with respect to determining if the absolute pan value equals the maximum pan value. If Pan$_{abs}$=Pan$_{max}$, indicating that the relative move command causes camera to reach the right limit, processing is performed to reduce the zoom request according to Equation (4) prior to generating and sending the updated zoom request command to the camera in step 722.

$$\text{Zoom}_{updated} = \max(\text{Zoom}_{request}, -\text{Pan}_{relative}) \tag{4}$$

This processing is also performed based on the relative tilt amount computed in step 712 to determine if $\text{Tilt}_{abs}=\text{Tilt}_{min}$ which indicates that the relative tilt move command causes the camera to reach the bottom limit. In this instance processing is performed to reduce the zoom request in accordance with Equation (5) prior to generating and sending the updated zoom request command to the camera in step 722.

$$\text{Zoom}_{updated} = \max(\text{Zoom}_{request}, -\text{Tilt}_{relative}) \tag{5}$$

This processing is also performed based on the relative tilt amount computed in step 712 to determine if $\text{Tilt}_{abs}=\text{Tilt}_{max}$ which indicates that the relative move command causes the camera to reach the top limit. In this instance, processing is performed to reduce the zoom request in accordance with Equation (6) prior to generating and sending the updated zoom request command to the camera in step 722.

$$\text{Zoom}_{updated} = \max(\text{Zoom}_{request}, -\text{Tilt}_{relative}) \tag{6}$$

If none of those checks are true the original $\text{Zoom}_{request}$ is sent to camera in step 722. It should be noted that the above computations in Equations (3)-(6) may be performed sequentially or in parallel depending on the resulting position based on the computation in step 712. For example, a target object may be located in a region in an image frame that would cause the camera to reach both the minimum tilt and the minimum pan values resulting in the need to reduce the zoom amount collectively based on these values to ensure that the target object still remains in substantially a center (or as close thereto) of the zoomed in region being captured as a still image.

Turning now to the second determination referenced above, the zoom amount provided as a control command to the image capture device is adaptively determined based the area/distance of the imaging target in relation to the image capture device.

Figure 9:
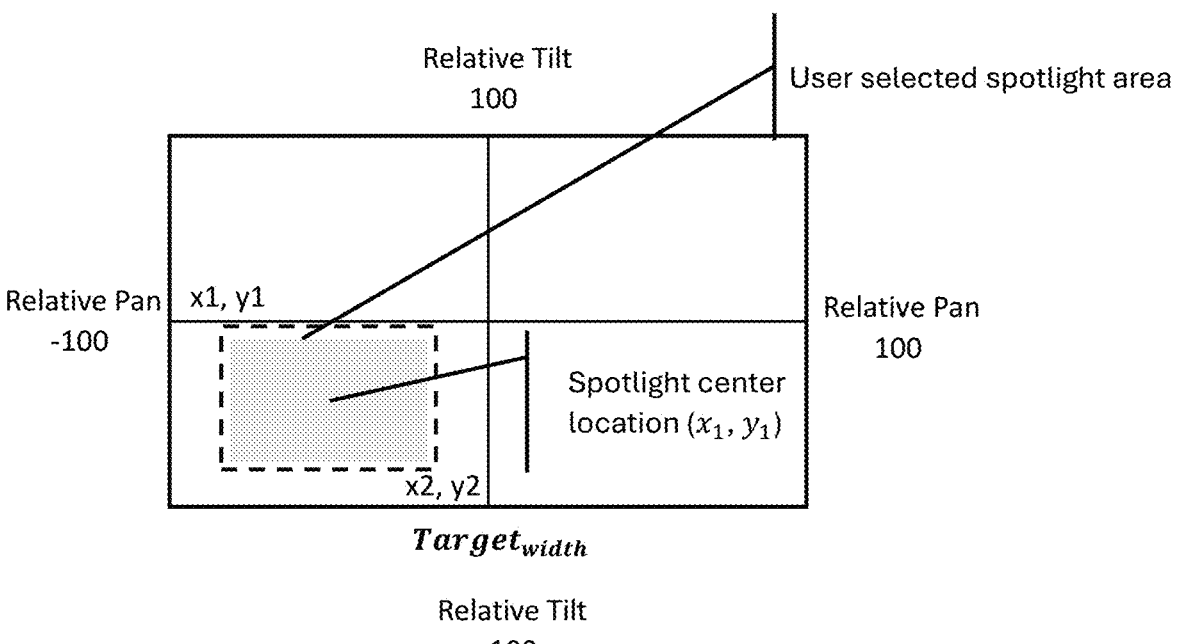
FIG. 9 illustrates exemplary processing results on data captured within the image capture region according to the present disclosure.

In a first embodiment of the second determination, the trigger operation performed is the selection of a region of an image frame from within the user interface to specify the area in the currently captured image frame to be spotlighted. This includes, for example, a user interface that displays the images being captured in the first operational mode and allows the user to select the imaging target therewith. The processing steps associated with this embodiment will be described with respect to FIGS. 9 and 10. These operations are performed using an input device (e.g. mouse or touch screen) of a computing device that is displaying an exemplary user interface such as shown in FIG. 9. The user interface is displaying an imaging region captured by the image capture device at a current position showing the full imaging region being captured. As shown in FIG. 9, the maximum and minimum relative pan and tilt values are illustrated for informational purposes and may (or may not)

be viewable within the user interface. In step 1002, user interface is provided that allows the user to specify and select the area within the image frame to apply a zoom operation. In step 1002, using an input device to interact with the provided user interface, a spotlight region is selected or otherwise specified by drawing a bounding box in the user interface using the input device. In one embodiment x, y, w, h values are determined from the bounding box drawn on the user interface, where w is the width of the bounding box and h is the height of the bounding box and x and y are substantially the center pixel point of the bounding box. In another embodiment, first coordinates x1, y1 are determined from a first bounding box corner and x2, y2 are determined from a second bounding box corner that is diagonally opposite from the first bounding box corner. From these determinations in step 1002, a center area of the bounding box is computed to obtain $x_1$, $y_1$ in step 1004. It is the computer center point in 1004 that is used to obtain the relative zoom amount needed to be applied by the camera to zoom into and capture the spotlight region. The relative zoom amount is computed in step 1006 using Equation (7)

$$\text{Zoom}_{relative} = \frac{(x_2 - x_1) * borderFactor}{(\text{Target}_{width})} \tag{7}$$

Where, $x_2$ represents a user selected right border x, $x_1$ represents a user selected left border x, $\text{Target}_{width}$ is the target frame width, and border Factor represents an amount of border to add to user select rectangle (100 mean no extra border. For example, 110 means 10% of extra border). The dotted rectangle shows the area after applying the border factor. The Border factor is a configurable value that is added to requested area so that any of the user requested area is not inadvertently omitted. This is advantageously applied because the camera pan/tilt value may not match exactly the requested center (from x1,y1,x2,y2), and this configurable value is used to adjust the zoom. The still image to be captured in the second operation mode includes the selected region and the region between the selected region and the dotted line in FIG. 9. If preferred, the border factor value can be set to no extra margin (in that case, some image portions near the border may be missed in final spotlight message). If greater margin is preferred the still image captured and representing the final spotlight includes some extra border without missing any border images. The value is 100 and up. If set to 100, no additional margin is added. If 110 then a 10% margin is added. The dotted line rectangle in the picture represents the final spotlight area with the margin added. In another embodiment, the border factor value can be automatically determined based on identification of an object and position of the object within the selected target region to ensure that the entire imaging target is contained within the spotlight image.

After the relative zoom amount in computed in step 1006, processing steps 1008 and 1010 are performed to compute the relative pan and relative tilt values which are used to send the movement command to the camera to cause the camera to capture the spotlight region specified in step 1002. These processing steps are the same as those described above in FIG. 7B in at least steps 712-722 and are not repeated but otherwise incorporated herein.

Figure 11:
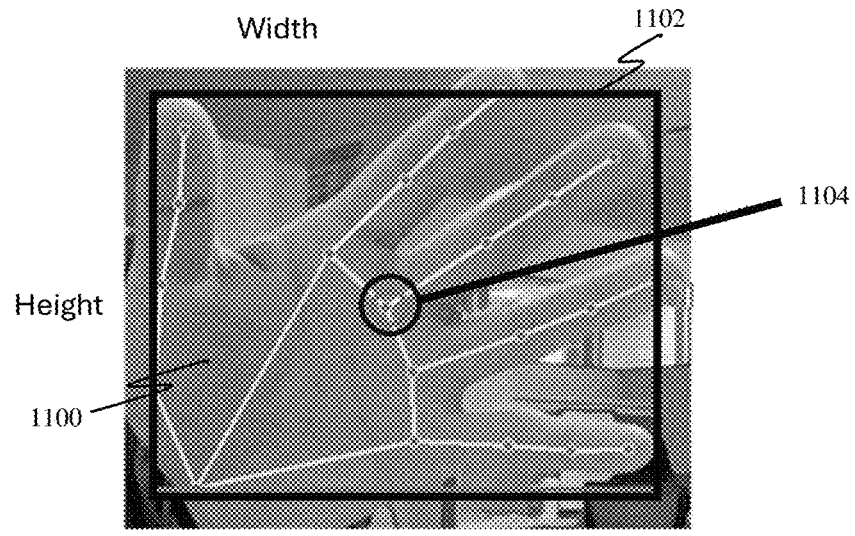
FIG. 11 depicts how an image of a user hand captured by the image capture device is processed in accordance with the present disclosure.
Figure 12:
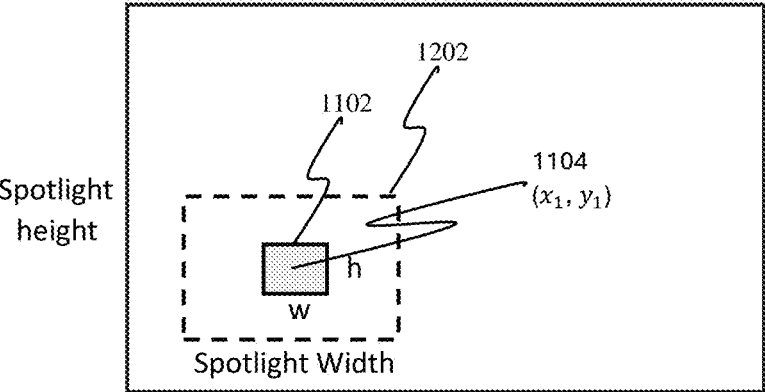
FIG. 12 illustrates exemplary processing results on data captured within the image capture region according to the present disclosure.
Figure 13:
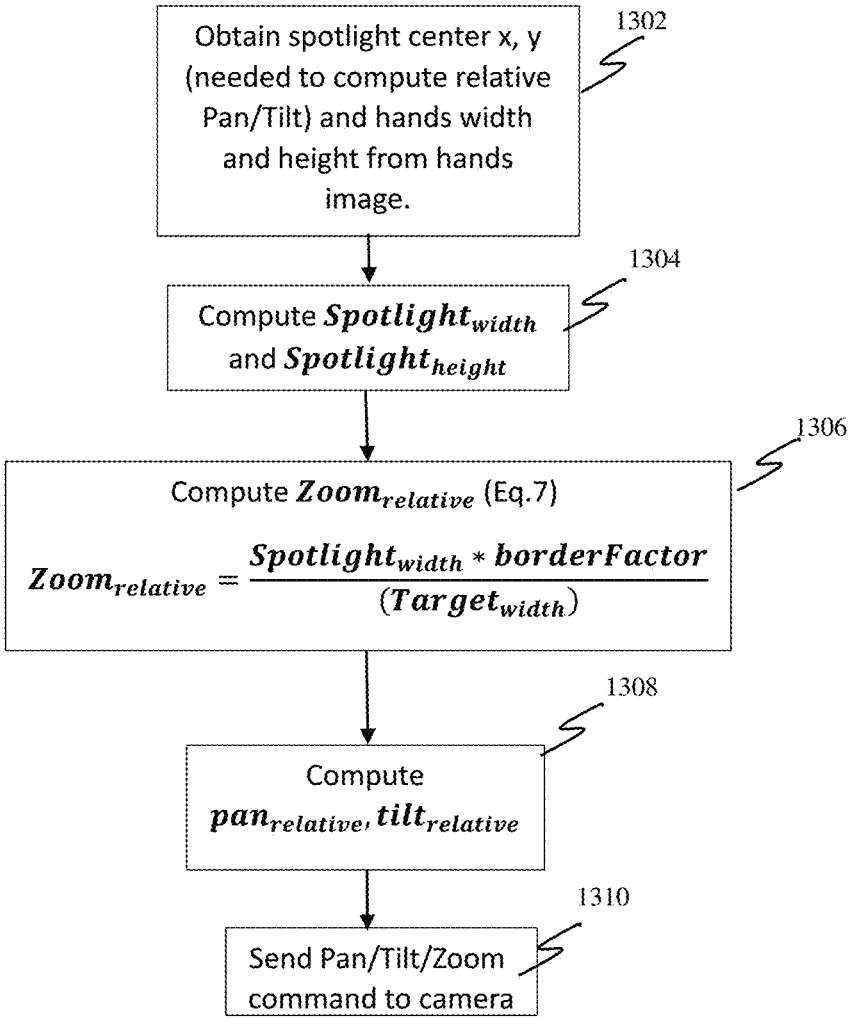
FIG. 13 is a flow diagram illustrating the processing algorithm performed according to the present disclosure.

In a second embodiment of the second determination the trigger operation for making the determination is based on a user physically performing a gesture that is captured by the image capture device 102 and determined, by the control apparatus 103, using a gesture recognition module executing thereon, that the gesture corresponds to the triggering operation. An exemplary gesture is shown in FIG. 11 and the size of the hand 1100 that made the gesture is determined and the imaging target is set to a substantial center position 1104 of a bounding box 1102 that represent the width and height of the hand 1100 that performed the gesture which represents the spotlight sign. The processing steps associated with this embodiment will be described with respect to FIGS. 11-13. In step 1302 of FIG. 13, a center point 1104 of a spotlight region is obtained using the image of a hand 1100 that is captured within the image frame as shown in FIG. 11. FIG. 11 illustrates a cropped image of a hand 1100 that was determined to have been making a predetermined gesture. This shown in crop to facilitate ease of understanding of the processing performed. In exemplary operation, the gesture recognition module detects the hands and identifies joint positions associated with the fingers and generates a skeletal structure connecting the determined joint locations and automatically generates a bounding box 1102 having a height and width in pixels corresponding to a region including the determined skeletal structure of the recognized hand. Turning to FIG. 12, the full image frame being captured by the image capture device 102 is illustrated. Therein, a user hand region 1102 which corresponds to the bounding box and a center point 1104 in FIG. 11 is shown having a height h and a width w where $x_1$, $y_1$ represents the center point coordinates of the bounding box 1104.

In step 1304, using the information described above, a processing is performed to calculate the spotlight width and spotlight height which are the values that are needed to define the boundaries of the region in the image frame on which to zoom as described above. The computations performed in step 1304 use Equations 8 and 9 as follows:

$$Spotlight_{width} = (w * Spotlight_{scale}) \qquad (8)$$

$$Spolight_{height} = (Spotlight_{width} * 9)/16 \qquad (9)$$

Where, w represents the user hand width, h represents user hand height, and a $Spotlight_{scale}$ represents multiplier factor to determine $Spotlight_{width}$ based on hand width (E.g.: 5). The spotlight scale is a configurable value that will determine how zoomed in or out the spotlight image is. A larger value will result in a more zoomed out spotlight image, while a smaller value will result in a more zoomed in spotlight image. Further, in equation 9, a perspective adjust factor is used in order to ensure that the boundary of the spotlight region has a 16 by 9 perspective for viewing on a display screen. The result of these calculations is illustrated as the dashed line box 1202 in FIG. 12.

Figure 10:
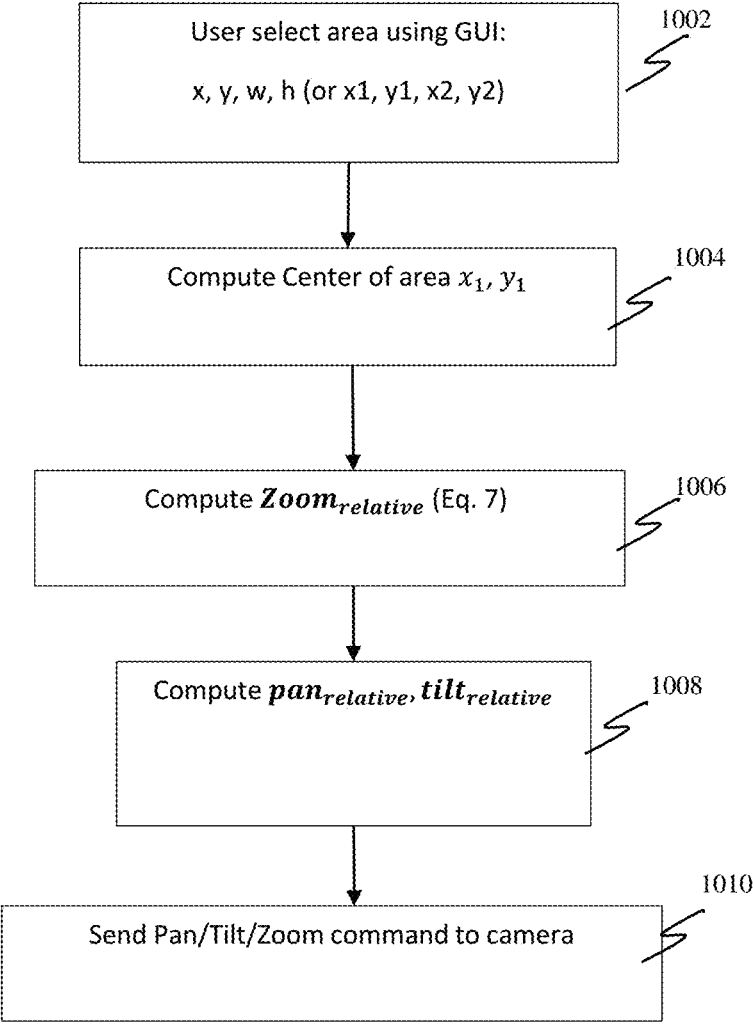
FIG. 10 is a flow diagram illustrating the processing algorithm performed according to the present disclosure.

In step 1306, the computed $Spotlight_{width}$ and $Spotlight_{height}$ and Spotlight center location $(x_1, y_1)$ are used as user selected spotlight area to compute $Zoom_{relative}$ as specified in FIG. 10 described above. As such, steps 1306-1310 in FIG. 13 mirror steps 1006-1010 in FIG. 10 and the description of these processing operations need not be repeated but are incorporated herein by reference.

Referring back to FIGS. 11 and 12, there is another embodiment that provides a plurality of different mechanisms for controlling a zoom amount to be provided for controlling a camera operation. The embodiment described above provides an algorithm for linear calculation of zoom control. In the algorithm described below, there is both linear and non-linear determinations for an amount of zoom for a given image frame in order to spotlight a particular area in the image frame. Determining zoom control in a non-linear fashion for controlling zoom amount to capture a particular region in an image frame designated by an object (e.g. hand) being detected in the desired region provides an additional advantage to ensure a proper amount of zoom be applied to capture the surrounding area. When detecting an object in a captured image frame and using a size of the object to determine an amount of zoom needed to capture the region in the image frame surrounding the object, an issue occurs whereby too much zoom or too little zoom amounts are determined depending on a position of the detected object relative to the image capture device. The following algorithm provides an alternative manner for determining a zoom amount to be applied in a given situation that considers an objects size based on a relative distance of the detected object to the image capture device.

According to this embodiment, the user hand width w and user hand height h is obtained as described hereinabove and the width and height represent a number of pixels within a bounding box in horizontal and vertical directions. From there an initial width of the spotlight region ($Spotlight_{width}$) is computed based on hand dimension. Different methods can be used to compute the initial spotlight width. In one example, the initial spotlight width is determined by linear scaling in relation to hands width (w) according to Equation 10

$$InitialSpotlight_{width} = (w * Spotlight_{scale}) \qquad (10)$$

where $Spotlight_{scale}$ is the constant multiplier factor described above which represents a a value that increases the width in pixels.

In another example, the initial spotlight width value is determined by linear scaling in relation to an area of the hand (h*w) as shown in Equation 11

$$InitialSpotlight_{width} = \sqrt{(w * h * Spotlight_{scale})} \qquad (11)$$

where $Spotlight_{scale}$ is the constant multiplier factor. This example represents a first form of non-linear determination for zoom amount.

In another example, the initial spotlight width value is determined by non-linear scaling in relation to hands width (w) according to Equation 12

$$InitialSpotlight_{width} = \left(Spotlight_{scale}/w^{SpotE}\right) \qquad (12)$$

where $Spotlight_{scale}$ is the constant multiplier factor and SpotE is a constant exponential factor to introduce nonlinearity. In exemplary operation, when value of SpotE is closer to zero the resulting spotlight region is larger whereas when the value is closer to 1 spotlight region is smaller.

Using one of the values of the initial spotlight width, a final value of $Spotlight_{width}$ is determined and is bounded by a predetermined minimum ($spot_{min}$) and maximum ($spot_{max}$) value provided in a configuration setting according to Equation 13

$$Spotlight_{width} = min(max(InitialSpotlight_{width}, spot_{min}), spot_{max}) \qquad (13)$$

In other words, given an initial spotlight, if less than min, then use min and if more than max use max. Upon determining the actual spotlight width value as noted above, processing can continue to compute the Spotlight$_{height}$ in accordance with Equation 9 described above and compute the relative zoom amount Zoom$_{relative}$ as specified in steps 1006 (or 1306).

While the above algorithm specifies different determinations that are made to adaptively adjust the zoom amount based on certain conditions, it should be understood that either one of the determinations of the first or second determination may be performed at a given time. The mere characterization of them as first and second determinations does not require them be temporally performed in order.

While the above algorithm specifies different determinations that are made to adaptively adjust the zoom amount based on certain conditions, it should be understood that either one of the determinations of the first or second determination may be performed at a given time. The mere characterization of them as first and second determinations does not require them be temporally performed in order.

According to the above disclosure, the following methods and control apparatus for determining an amount of zoom to be applied to spotlight a particular region of an image frame can be realized. The processing operations include identifying an imaging target in an image being captured by an image capture device (e.g. a pan, tilt, zoom camera), determining, based on a current imaging condition (e.g. a position of the image capture device relative to maximum and minimum directional movement limits), an amount of zoom needed to be applied by the image capture device such that the imaging target is substantially centered in an image frame, providing a control command to the image capture device that controls the image capture device to obtain an image of the imaging target using the determined amount of zoom, and controlling the image capture device to capture an image of the imaging target at the provided zoom level by controlling the image capture device to perform one or both of a pan and tilt movement prior to controlling the zoom of the image capture device to be at the provided zoom level.

According to the above disclosure, the following methods and control apparatus for determining an amount of zoom to be applied to spotlight a particular region of an image frame can be realized. The processing operations include identifying an imaging target in an image being captured by an image capture device, determining, based on a current imaging condition, an amount of zoom needed to be applied by the image capture device such that the imaging target is substantially centered in an image frame, modifying the determined zoom amount in response to a determination that that the determined zoom amount would cause the image capture device to exceed a directional movement limit, providing a control command to the image capture device that controls the image capture device to obtain an image of the imaging target using one of the determined amount of zoom or the modified zoom amount, and controlling the image capture device to capture an image of the imaging target at the zoom level included in the control command.

In an embodiment, the processing operation for determining includes determining an amount of zoom based on a current position of the image capturing device and its location relative to a directional movement limit and that the determined zoom amount ensures that the imaging target is within the image frame to be captured. This advantageously enables the operation of providing the control command to control the image capture device to move and approach the directional movement limit while maintaining the imaging target in the image frame to be captured.

In another embodiment, the processing operations for determining the amount of zoom include obtaining, for the image capture device, at least one maximum directional movement limit and at least one minimum directional movement limit associated with at least one type of direction movement, obtaining a current position of the image capturing device, obtain target position for the image capture device to capture the image of the imaging target, generate the control command that causes the image capture device to move in the at least one type of direction such that the target position is substantially in a center of an image frame to be captured using a first zoom amount, and update the first zoom amount to a second different zoom amount in response to determining that the control command would cause the image capture device to exceed one of the minimum directional movement limit or the maximum directional movement limit.

In a further embodiment, the processing operations for determining the amount of zoom include determining if the generated control command would cause the image capture device to reach one of the maximum direction movement limit or the minimum direction movement limit in order to use the first zoom amount to capture the imaging target, and generating an updated amount in response to the determination, wherein the updated zoom amount is lower than the first zoom amount ensuring the imaging target is within the image frame to be captured, and controlling the image capture device to capture the imaging target using the updated zoom amount.

In another embodiment, the processing operations for determining the amount of zoom include using a location of the imaging target to compute an initial movement command needed to control the image capture device to move so that the image target is in the imaging frame, comparing one or more directional movement values in the initial movement command with one or more directional movement limits of the image capturing device, and generate a zoom amount based on a difference between requested zoom amount and the initial movement command, wherein the generated zoom amount is less than the requested zoom amount when the initial movement command would cause the image capture device to exceed a directional movement limit.

In other embodiments, the processing operations further include selecting, by the user, a region in the currently captured image as the imaging target for which the zoom amount is to be determined. The selecting operation can include using an input device to select the imaging target within an image currently being captured by the image capture device and displayed on a display device. The selecting operation can include determining, from within the image being captured, that a predetermined gesture is performed by a user, selecting, as the imaging target, a region of the captured image where the predetermined gesture is performed, wherein the imaging target corresponds to substantially a center point of a body part that performed the predetermined gesture, and by using the center point of the body part, generating a bounding box around the perimeter of the body part as the imaging target.

Other embodiments include processing operations for determining the zoom amount based on a difference between at least one set of parallel borders of the selected region and dividing the difference by a target width of the image frame that is currently being captured and applying a boarder factor to the determined difference to expand the selected region a predetermined amount beyond the selected region.

In other embodiments, processing operations for determining the amount of zoom include determining a dimension of the identified imaging target, generating, using the determined dimension and a scaling factor, a region having a first size, comparing the first size of the region with a minimum region size and maximum region size; and selecting, as target region size, one of the first size, minimum region size or maximum based on the comparison. In exemplary operation, the first size is selected when the first size is between the minimum and maximum region size, the minimum size is selected when the first size is less than the minimum region size, or the maximum size is selected when the first size is greater than the maximum region size.

Further embodiments include processing operations for determining the amount of zoom by using a dimension of the identified imaging target to generate a region size by performing a non-linear scaling operation on the identified imaging target based on a proximity of the imaging target relative to an image capture device capturing the imaging target, wherein performing the non-linear scaling operation includes dividing a constant scaling factor by an exponential factor applied to the dimension.

Any combination of the above embodiments can be embodied as a control apparatus that is configured to communicate with an image capture device such that the control apparatus includes at least one memory storing instructions, and at least one processor that, upon execution of the stored instructions, is configured to execute the processing operations in any of the above embodiments.

Further provided is a system that includes an image capture device configured to capture video and still image data and which can pan, tilt and zoom based on control commands, and a control apparatus in communication with the image capture device, the control apparatus configured to generate and provide control commands to the image capture device. The control device includes at least one memory storing instructions, and at least one processor that, upon execution of the stored instructions, is configured to execute the processing operations in any of the above embodiments.

It should be understood that any of the above described configurations and embodiments, may be combined in any manner and the scope of the invention according to the present disclosure contemplates the various different embodiments.

While different exemplary embodiments have been described, respective features of each of these exemplary embodiments can be combined in accordance with the principles of the disclosure therein. As such, the above descriptions are intended to clearly describe the principles of each exemplary embodiment and skilled artisans would be able to combine respective features of one or more of the exemplary embodiments and combine them with features of any of the other exemplary embodiments.

The scope of the present disclosure includes a non-transitory computer-readable medium storing instructions that, when executed by one or more processors, cause the one or more processors to perform one or more exemplary embodiments of the present disclosure. Examples of a computer-readable medium include, but are not limited to, a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can be supplied to the computer-readable storage medium via download via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

The present disclosure can be incorporated in the form of a variety of embodiments, only a few of which are disclosed herein. Variations of those embodiments may become apparent to those of ordinary skill in the art upon reading the foregoing description. Accordingly, this disclosure and any embodiments derived therefrom includes all modifications and equivalents of the subject matter recited in the claims appended hereto as permitted by applicable law. Any combination of the above-described elements in all possible variations thereof is encompassed by the disclosure unless otherwise indicated herein or otherwise clearly contradicted by context.

We claim:

1. A method comprising:

identifying an imaging target in an image being captured by an image capture device;

determining, based on a current imaging condition, an amount of zoom needed to be applied by the image capture device such that the imaging target is substantially centered in an image frame;

modifying the determined zoom amount in response to a determination that that the determined zoom amount would cause the image capture device to exceed a directional movement limit;

generating a control command to the image capture device that controls the image capture device to obtain an image of the imaging target using one of the determined amount of zoom or the modified zoom amount;

determining if the generated control command would cause the image capture device to reach one of the maximum direction movement limit or the minimum direction movement limit in order to the determined amount of zoom to capture the imaging target;

generating an updated zoom amount in response to the determination regarding the generated control command, wherein the updated zoom amount is lower than the determined zoom amount ensuring the imaging target is within the image frame to be captured;

controlling the image capture device to capture an image of the imaging target at the zoom level included in the control command.

2. The method according to claim 1, wherein the activity of controlling the image capture device includes controlling the image capture device to perform one or both of a pan and tilt movement prior to controlling the zoom of the image capture device to be at the provided zoom level.

3. The method according to claim 1, wherein activity of determining includes determining an amount of zoom based on a current position of the image capturing device and its location relative to a directional movement limit.

4. The method according to claim 1, wherein providing the control command includes controlling the image capture device based on the modified zoom amount to move and approach the directional movement limit while maintaining the imaging target in the image frame to be captured.

5. The method according to claim 1, wherein the activity of determining the amount of zoom includes obtaining, for the image capture device, at least one maximum directional movement limit and at least one minimum directional movement limit associated with at least one type of direction movement obtaining a current position of the image capturing device;

obtain target position for the image capture device to capture the image of the imaging target;

generate the control command that causes the image capture device to move in the at least one type of direction such that the target position is substantially in a center of an image frame to be captured using a first zoom amount;

update the first zoom amount to a second different zoom amount in response to determining that the control command would cause the image capture device to exceed one of the minimum directional movement limit or the maximum directional movement limit, wherein the second different zoom amount is used in the activity of modifying the determined zoom amount.

6. The method according to claim 1, wherein the activity of determining the amount of zoom includes using a location of the imaging target to compute an initial movement command needed to control the image capture device to move so that the image target is in the imaging frame;

comparing one or more directional movement values in the initial movement command with one or more directional movement limits of the image capturing device; and generate a zoom amount based on a difference between requested zoom amount and the initial movement command, wherein the generated zoom amount is less than the requested zoom amount when the initial movement command would cause the image capture device to exceed a directional movement limit.

7. The method according to claim 1, wherein determining the zoom amount includes using an identified imaging target location to calculate the zoom amount based on the imaging target being at substantially a center position of an image frame.

8. The method according to claim 1, further comprising:

selecting a region in the currently captured image as the imaging target for which the zoom amount is to be determined by using an input device to select the imaging target within an image currently being captured by the image capture device and displayed on a display device.

9. The method according to claim 1, further comprising:

determining, from within the image being captured, that a predetermined gesture is performed by a user;

selecting, as the imaging target, a region of the captured image where the predetermined gesture is performed, wherein the imaging target corresponds to substantially a center point of a body part that performed the predetermined gesture; and generating a bounding box around the perimeter of the body part as the imaging target.

10. The method according to claim 1, further comprising determining the zoom amount based on a difference between at least one set of parallel borders of the selected region and dividing the difference by a target width of the image frame that is currently being captured.

11. The method according to claim 10, further comprising applying a boarder factor to the determined difference to expand the selected region a predetermined amount beyond the selected region.

12. The method according to claim 1, wherein the activity of determining the amount of zoom includes determining a dimension of the identified imaging target;

generating, using the determined dimension and a scaling factor, a region having a first size;

comparing the first size of the region with a minimum region size and maximum region size; and selecting, as target region size, one of the first size, minimum region size or maximum based on the comparison, wherein the first size is selected when the first size is between the minimum and maximum region size;

the minimum size is selected when the first size is less than the minimum region size; or the maximum size is selected when the first size is greater than the maximum region size.

13. The method according to claim 1, wherein the activity of determining the amount of zoom includes using a dimension of the identified imaging target to generate a region size by performing a non-linear scaling operation on the identified imaging target based on a proximity of the imaging target relative to an image capture device capturing the imaging target, wherein the non-linear scaling operation includes dividing a constant scaling factor by an exponential factor applied to the dimension.

14. An apparatus that is configured to communicate with an image capture device comprising:

at least one memory storing instructions; and at least one processor that, upon execution of the stored instructions, is configured to execute the following operations:

identifying an imaging target in an image being captured by an image capture device;

determining, based on a current imaging condition, an amount of zoom needed to be applied by the image capture device such that the imaging target is substantially centered in an image frame;

modifying the determined zoom amount in response to a determination that that the determined zoom amount would cause the image capture device to exceed a directional movement limit; and generating a control command to the image capture device that controls the image capture device to obtain an image of the imaging target using one of the determined amount of zoom or the modified zoom amount;

determining if the generated control command would cause the image capture device to reach one of the maximum direction movement limit or the minimum direction movement limit in order to the determined amount of zoom to capture the imaging target;

generating an updated zoom amount in response to the determination regarding the generated control command, wherein the updated zoom amount is lower than the determined zoom amount ensuring the imaging target is within the image frame to be captured;

controlling the image capture device to capture an image of the imaging target at the zoom level included in the control command.

15. The apparatus according to claim 14, wherein execution of the stored instructions further configures the one or more processors to determine the amount of zoom by obtaining, for the image capture device, at least one maximum directional movement limit and at least one minimum directional movement limit associated with at least one type of direction movement obtaining a current position of the image capturing device;

obtain target position for the image capture device to capture the image of the imaging target;

generate the control command that causes the image capture device to move in the at least one type of direction such that the target position is substantially in a center of an image frame to be captured using a first zoom amount;

update the first zoom amount to a second different zoom amount in response to determining that the control command would cause the image capture device to exceed one of the minimum directional movement limit or the maximum directional movement limit, wherein the second different zoom amount is used in the activity of modifying the determined zoom amount.

16. The apparatus according to claim 14, wherein execution of the stored instructions further configures the one or more processors to determine the amount of zoom by using a location of the imaging target to compute an initial movement command needed to control the image capture device to move so that the image target is in the imaging frame;

comparing one or more directional movement values in the initial movement command with one or more directional movement limits of the image capturing device; and generate a zoom amount based on a difference between requested zoom amount and the initial movement command, wherein the generated zoom amount is less than the requested zoom amount when the initial movement command would cause the image capture device to exceed a directional movement limit.

17. The apparatus according to claim 14, wherein execution of the stored instructions further configures the one or more processors to determine the amount of zoom by determining a dimension of the identified imaging target;

generating, using the determined dimension and a scaling factor, a region having a first size;

comparing the first size of the region with a minimum region size and maximum region size; and selecting, as target region size, one of the first size, minimum region size or maximum based on the comparison, wherein the first size is selected when the first size is between the minimum and maximum region size;

the minimum size is selected when the first size is less than the minimum region size; or the maximum size is selected when the first size is greater than the maximum region size.

18. The apparatus according to claim 14, wherein execution of the stored instructions further configures the one or more processors to determine the amount of zoom by using a dimension of the identified imaging target to generate a region size by performing a non-linear scaling operation on the identified imaging target based on a proximity of the imaging target relative to an image capture device capturing the imaging target, wherein the non-linear scaling operation includes dividing a constant scaling factor by an exponential factor applied to the dimension.

19. A system comprising:

an image capture device configured to capture video and still image data and which can pan, tilt and zoom based on control commands;

a control apparatus in communication with the image capture device, the control apparatus configured to generate and provide control commands to the image capture device, wherein the control apparatus includes at least one memory storing instructions; and at least one processor that, upon execution of the stored instructions, is configured to execute the following operations:

identifying an imaging target in an image being captured by an image capture device;

determining, based on a current imaging condition, an amount of zoom needed to be applied by the image capture device such that the imaging target is substantially centered in an image frame;

modifying the determined zoom amount in response to a determination that that the determined zoom amount would cause the image capture device to exceed a directional movement limit; and generating a control command to the image capture device that controls the image capture device to obtain an image of the imaging target using one of the determined amount of zoom or the modified zoom amount;

determining if the generated control command would cause the image capture device to reach one of the maximum direction movement limit or the minimum direction movement limit in order to the determined amount of zoom to capture the imaging target;

generating an updated zoom amount in response to the determination regarding the generated control command, wherein the updated zoom amount is lower than the determined zoom amount ensuring the imaging target is within the image frame to be captured;

controlling the image capture device to capture an image of the imaging target at the zoom level included in the control command.

* * * * *